United States Patent [19]

Liu

[11] Patent Number: 5,040,164

[45] Date of Patent: Aug. 13, 1991

[54] RECORD PLAYER WITH TURNTABLE BRAKE AND BALANCE WHEELS

[75] Inventor: Ping-Hsiung Liu, Tainan, Taiwan

[73] Assignee: Han Ping Electron Co., Ltd., Tainan, Taiwan

[21] Appl. No.: 503,945

[22] Filed: Apr. 4, 1990

[51] Int. Cl.[5] ............................................ G11B 27/10
[52] U.S. Cl. ........................ 369/268; 369/232; 369/234; 369/237; 369/213
[58] Field of Search .............. 369/189, 211, 231, 232, 369/233, 234, 237, 268, 213, 258, 263

[56] References Cited

U.S. PATENT DOCUMENTS

| 1,316,138 | 9/1919 | Brahy | 369/234 |
|---|---|---|---|
| 1,330,559 | 2/1920 | Storle | 369/234 |
| 1,360,080 | 11/1920 | Bloomquist | 369/268 |
| 1,415,800 | 5/1922 | Coplin | 369/234 |
| 1,457,036 | 5/1923 | Kree | 369/237 |
| 1,487,127 | 3/1924 | Stuppau | 369/232 |
| 2,240,320 | 4/1941 | Thompson | 369/268 |
| 2,278,680 | 4/1942 | Thompson | 369/268 |
| 2,479,640 | 8/1949 | Rieber | 369/213 |
| 2,627,414 | 2/1953 | Sear | 369/268 |
| 3,460,840 | 8/1969 | Koepke | 369/268 |
| 4,326,284 | 4/1982 | Elliot | 369/268 |

FOREIGN PATENT DOCUMENTS

| 0015036 | 8/1928 | Australia | 369/232 |
|---|---|---|---|
| 0034206 | 2/1925 | Denmark | 369/234 |
| 0544198 | 6/1922 | France | 369/232 |
| 0325837 | 2/1930 | United Kingdom | 369/234 |

Primary Examiner—Stuart S. Levy
Assistant Examiner—John Pokotylo
Attorney, Agent, or Firm—Morton J. Rosenberg; David I. Klein

[57] ABSTRACT

A record player is provided with a turntable brake for instantly stopping the turntable of the record player in playback when desired and a pair of balance wheels for permitting slant of the turntable within a predetermined range when manually operating the turntable. The turntable hereof has a peripheral drum portion extending downwardly from its bottom and a rubber shoe is mounted on one end of a pivoted lever arm. The lever arm is adapted to be actuated to press the rubber shoe against the drum portion of the turntable for stopping rotating movement of the turntable by means of friction.

1 Claim, 3 Drawing Sheets

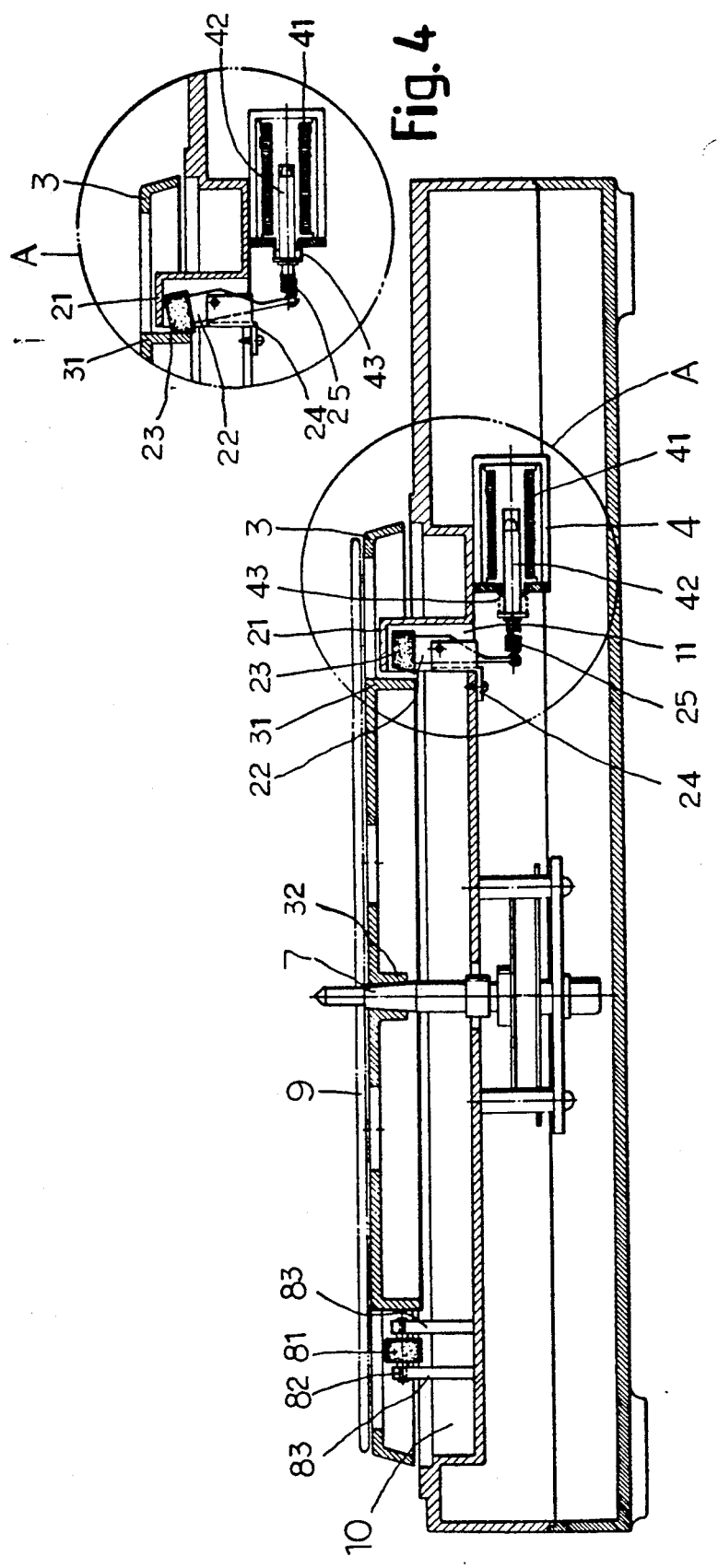

RECORD PLAYER WITH TURNTABLE BRAKE AND BALANCE WHEELS

BACKGROUND OF THE INVENTION

This invention relates to a record player and more particularly to a record player having an auxiliary turntable brake and balance wheel combination.

Conventionally, record players for playback of audio records only pause when such is turned off. This allows the audience or listener to interrupt the program for as long as desired however, some of the audio contents of the record are lost since the rotational momentum of the turntable causes record displacement before the record stops. Furthermore, in many instances, especially at dancing parties, disc jockeys occasionally manually turn the turntable by pressing an end portion of the record rotating on the turntable which generates screeches for the amusement of the listeners which may result in permanent inclination or displacement of the centering spindle. To this end, the inventor has attempted to provide for an improved structure of a record player to overcome the drawbacks of known record players.

SUMMARY OF THE INVENTION

Accordingly, objects of this invention are to overcome the problems and disadvantages of prior art record players and to obtain improved record player structures with novel advantages not heretofore available.

Another object of this invention is to provide an improved record player having a turntable braking device for performing a "pause" function.

A further object of this invention is to provide an improved record player having opposed balance wheels for preventing a centered spindle from being slanted or inclined permanently caused by manual operations.

With the above objects in view, a record player according to this invention is provided with a turntable for substantially instantly stopping the turntable of the record player in a playback mode when desired as well as a pair of balance wheels for permitting inclination of the turntable within a predetermined range when manually operating the turntable. The turntable as herein described includes a peripheral drum portion extending downwardly from a bottom portion thereof. A rubber shoe is mounted on one end of a pivoted lever arm which can be actuated to frictionally press the rubber shoe against the drum portion of the turntable thereby stopping the rotation of the turntable by means of friction.

BRIEF DESCRIPTION OF THE DRAWINGS

FIG. 3 is a cross-sectional view of the record player of this invention wherein the braking device is in its release state; and, FIG. 4 is a cross-sectional view of a section of the record player shown in FIG. 3 wherein the braking device is in its braked state.

DETAILED DESCRIPTION OF THE PREFERRED EMBODIMENT

Figure 1:
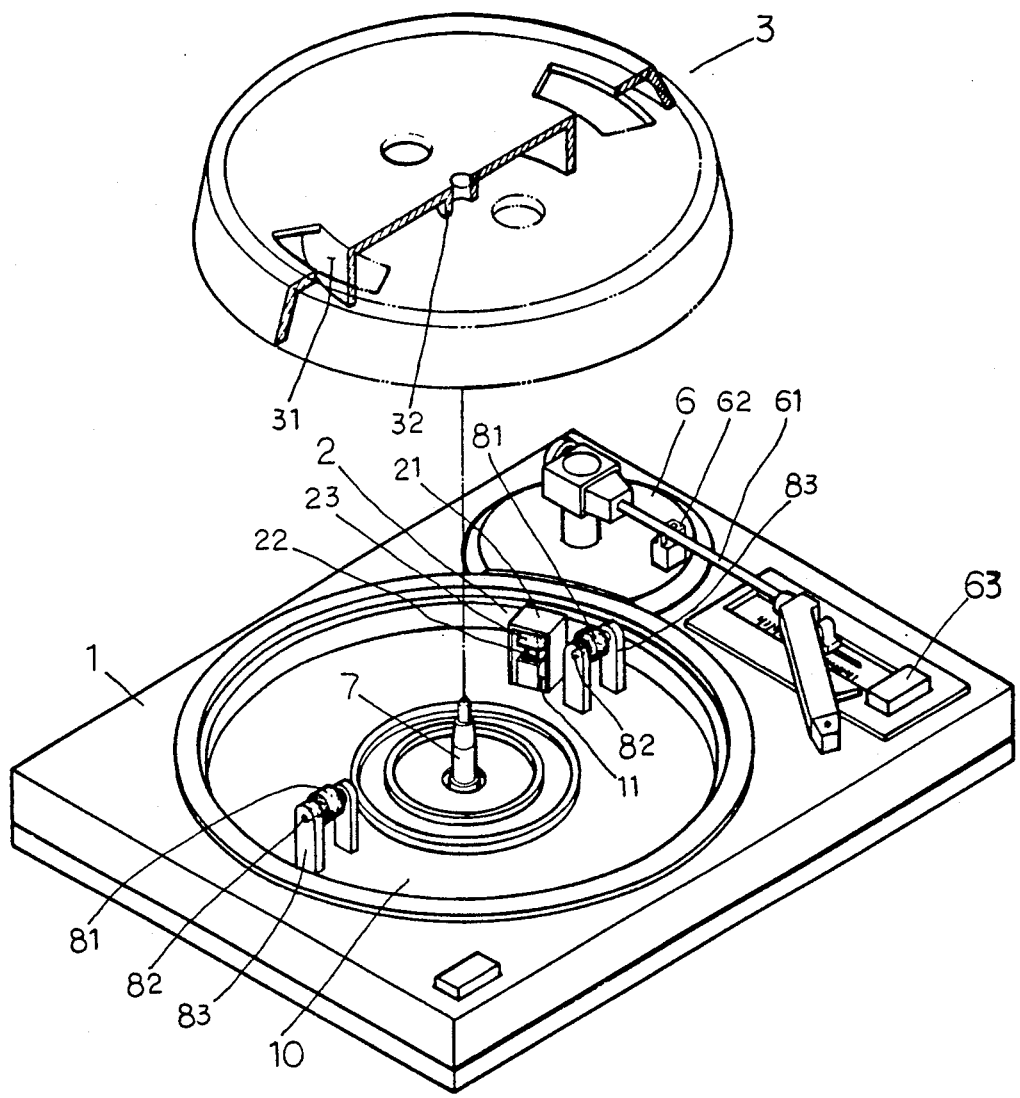
FIG. 1 is an exploded perspective view of the preferred embodiment of this invention.
Figure 2:
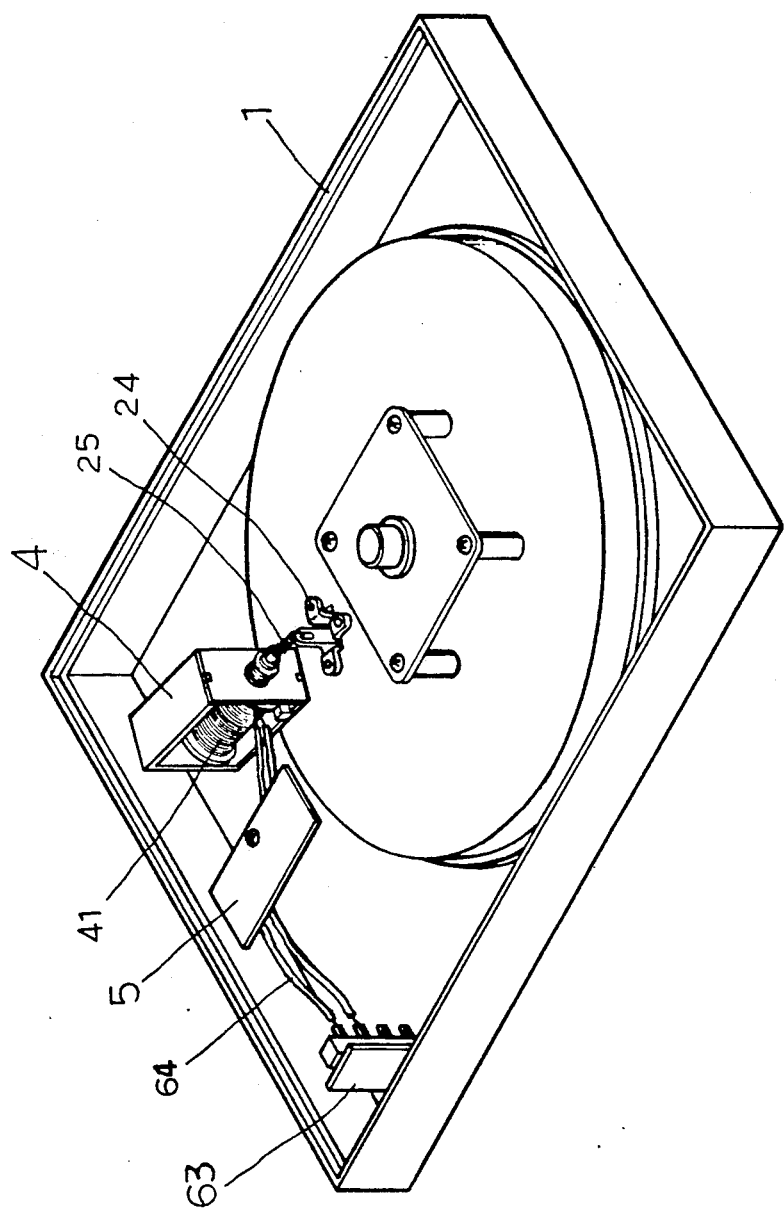
FIG. 2 is a perspective view of the preferred embodiment of the subject record player in an inverted state.

Referring now to FIGS. 1-3, a record player is shown according to this invention which comprises a base plate 1 having a central depressed portion 10, a centering spindle 7 which is provided for rotatably mounting a turntable 3. A casing 21 is eccentrically located in the depressed portion 10 for housing a rubber shoe 23 and a lever 22 of a braking device 2. A pair of balance wheels 81 are mounted on opposing sides of the spindle 7 within the depressed portion 10. A tone arm 61 is rotatably mounted on a tone arm housing subassembly 6 and is provided with a rest post portion 62 which extends upwardly from the housing 6 and includes a notch formed in a top surface thereof within which the tone arm 61 may be seated when the record player is turned off. A pushbutton 63 is provided to be actuated and actuate the record player to a "Pause" mode.

The turntable 3 is integrally provided with a drum portion 31 extending downwardly from the bottom thereof and coaxially surrounds the hub 32.

The braking device 2 includes a bracket 24 secured to the base plate 1 and forms an opening 11 in the depressed portion 10. The lever 22 extends through the opening 11 and is pivotally mounted to the bracket 24 substantially in a vertical direction. The shoe 23 is formed of a frictional material such as rubber and is mounted on the top end of the lever 22 and abuts the drum portion 31 of the turntable 3. A magnetic clutch 41 is protected by a housing 4 and is secured to the bottom of the base plate 1. The clutch 41 includes a sliding core 42 having a front end connecting the lower end of the lever 22. The sliding core 42 can be displaced to move between a locking position (as shown in FIG. 4) and an unlocking position (as shown in FIG. 3) by means of a pushbutton 63 through control wires 64 and a control circuit board 5.

A sleeved spring 25 is located on the front end of the core 42 and is biased to normally push the core 42 from its unlocking position to its locking position.

In operation, in order to place the record player of this invention in the "Pause" mode to permit the audience or listener to interrupt the playback of the record 9 for a predetermined length of time without missing any of the audio record contents, the pushbutton 63 is pressed to operate the magnetic clutch 42. The spring 25 which is biased to displace the core 42 from its unlocking position to its locking position and the pivoting lever 22 is turned counterclockwise to press the rubber shoe 23 against the drum portion 31 of the turntable 3, thus stopping the turntable 3 almost immediately by means of friction applied thereto.

A pair of balance wheels 81 are opposedly provided in the depressed portion of the plate 1 for preventing slant or inclination of the centering spindle 7 caused by manually rotating the turntable 3. The balance wheels 81 include a pair of brackets 83, each of which has two spaced posts upraised or rising from the depressed portion 10. The balance wheels 81 are located at opposite sides of the depressed portion 10. Two axis shafts 82 are radially aligned and respectively secured on the top ends of the brackets 83. The balance wheels 81 are preferably formed of a frictional material such as rubber, and are rotatably mounted on the axis shafts 82. The wheels 81 as constructed allow slight inclination or slanting of the turntable 3 which is rotatably mounted on the centering spindle 7.

The foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A record player comprising:
   a base plate having a central depressed portion extending around a substantially vertically directed axis line;
   an opening formed in the central depressed portion, said opening being radially displaced from said vertically directed axis line;
   a centering spindle extending coincident said vertically directed axis line and located within the depressed portion of said base plate;
   a turntable rotatably mounted on the centering spindle and formed with a peripheral lip portion extending downwardly from a bottom surface thereof;
   a lever member extending through said opening formed in the depressed portion of said base plate;
   pivotal means secured to the base plate to maintain the lever member in a generally vertical position for pivoting the lever member between a first and a second position;
   a rubber shoe member mounted on a top end of the lever member protruding through the opening of the depressed portion of the base plate and abutting the peripheral lip portion of the turntable;
   acutating means disposed under the base plate and connected to a bottom end of the lever member for actuating the lever member to pivot between the first position where the rubber shoe member is pressed against the lip portion of the turntable to stop rotating movement of the turntable by means of friction and the second position where the rubber shoe member is withdrawn from engagement with the lip portion of the turntable to allow free rotating movement of the turntable;
   switch means for manually operating the acutating means to acutate the pivoted lever member between the first and second position, and,
   balance wheel means mounted on opposing sides of said depressed portion of said base plate for supporting the turntable rotatably mounted on the centering spindle and allow inclination thereof within a predetermined range, said balance wheel means including a pair of vertically extending balance wheel brackets having an axis shaft radially aligned each with respect to the other, and a pair of rubber wheels rotatably mounted on said axis shafts for interface with said turntable.

* * * * *